J. F. COLLINS.
AUTOMOBILE STARTING DEVICE.
APPLICATION FILED SEPT. 7, 1918.
1,418,068.
Patented May 30, 1922.
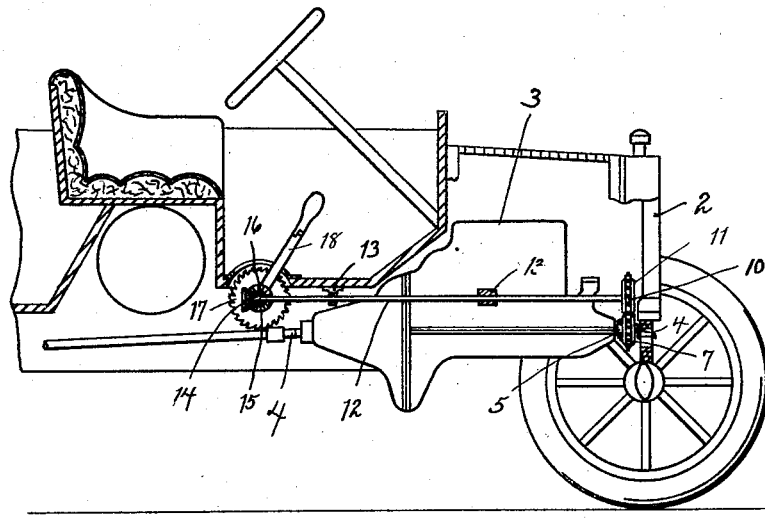
Fig. 1.
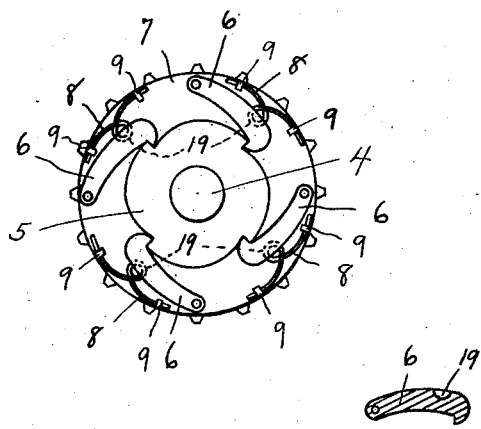
Fig. 2.
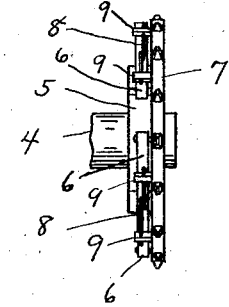
Fig. 3.
Fig. 4.
INVENTOR
John F. Collins
By W. W. Williamson
Atty.

UNITED STATES PATENT OFFICE.

JOHN F. COLLINS, OF PHILADELPHIA, PENNSYLVANIA.

AUTOMOBILE STARTING DEVICE.

1,418,068. Specification of Letters Patent. Patented May 30, 1922.

Application filed September 7, 1918. Serial No. 253,038.

*To all whom it may concern:*

Be it known that I, JOHN F. COLLINS, a citizen of the United States, residing at Philadelphia, in the county of Philadelphia and State of Pennsylvania, have invented new and useful Improvements in Automobile Starting Devices, of which the following is a specification.

My invention relates to new and useful improvements in a starting mechanism for internal combustion engines, and has for its object to provide a device of this character, which may be manually actuated from the operator's seat of an automobile, aeroplane or other vehicle propelled by engines requiring an initial starting operation.

A further object of the invention is to provide a device of the character stated consisting of a ratchet wheel fixed to the crank shaft of the engine with which are associated a plurality of dogs or pawls pivoted to a sprocket wheel loosely journalled or rotatably mounted upon the crank shaft adjacent the ratchet wheel and each of said dogs is normally forced toward the ratchet wheel by means of suitable springs attached to the sprocket wheel and registering with a chamber or cavity in each of the dogs and means associated with said sprocket wheel whereby the latter may be rotated.

With these ends in view, my invention consists in the details of construction and combination of elements hereinafter set forth and then specifically designated by the claim.

In order that those skilled in the art to which this invention appertains, may understand how to make and use the same, I will describe its construction in detail, referring by numeral to the accompanying drawing forming a part of this application, in which—

Fig. 1, is a sectional view of a portion of an automobile showing my starting mechanism applied thereto.

Fig. 2, is an enlarged face view of the ratchet and sprocket wheel mounted upon the crank shaft.

Fig. 3, is an edge view thereof, and

Fig. 4, is a longitudinal, sectional view of one of the dogs.

In carrying out my invention as here embodied I have shown the same in conjunction with an automobile here represented by the numeral 2, which is provided with an engine 3, having a crank shaft 4. On some suitable portion of this crank shaft is mounted and securely fixed thereto a ratchet wheel 5 having a plurality of teeth preferably four in number and equally spaced apart so that when the crank shaft is to be given its initial rotary motion the said ratchet teeth will all be engaged simultaneously by a plurality of dogs or pawls 6 which are pivoted to one face of a sprocket wheel 7 adjacent its outer circumference. Said sprocket wheel being loosely mounted or rotatably journalled on the crank shaft in close proximity to the ratchet wheel.

The nose of each dog is normally forced toward the ratchet wheel by means of a suitable spring 8, the center of the loop of which rests in a suitable chamber or cavity 19 in the back of each dog adjacent its head while the ends of said springs pass through lugs 9 formed integral with the sprocket wheel, but it is to be understood that the ends of said springs are only loosely mounted in place so that the necessary movement can take place as the heads of the dogs are moved in or out.

A chain 10 engages the sprocket wheel 7 and another sprocket wheel 11 which is mounted upon one end of a shaft 12 journalled in suitable brackets 13 while on the opposite end of said shaft 12 is mounted a bevel gear 14, which meshes with another bevel gear 15 carried by the shaft 16 situated at the right angles to the shaft 12, the latter being located near the operator's seat.

On the shaft 16 is also mounted a ratchet wheel 17 of large diameter and this ratchet wheel is actuated by a suitable operating lever 18 journalled upon the shaft 16 and carrying a spring actuated dog so that the ratchet wheel 17 may be rotated in one direction by the operator when desired and this lever is preferably formed of two parts so hinged that when the outer portion is raised one end thereof will rest upon one end of the inner portion, permitting said lever to be used without latches or triggers which often break or become disarranged.

In practice when it is desired to start the engine the operating lever is placed in the position shown in Fig. 1, then by giving the operating lever a short, quick pull, motion will be transmitted through the ratchet wheel 17 the shaft 16, the bevel gears 15 and 14, the shaft 12, the sprocket wheels and chain and then through the dogs 6 and the ratchet wheel 5 to the crank shaft 4 of the engine, thereby giving said engine the necessary initial movement to start the same as will be readily understood.

Of course I do not wish to be limited to the exact details of construction as herein shown, as these may be varied within the limits of the appended claim without departing from the spirit of my invention.

Having thus fully described my invention, what I claim as new and useful, is—

In a device of the character described, a ratchet wheel adapted to be fixed to a shaft to be rotated, a wheel journalled on said shaft adjacent said ratchet wheel, dogs pivoted to one face of the last mentioned wheel adapted to coact with the ratchet wheel, said dogs each having a chamber in its back near its head and springs each connected at two points to the second named wheel, each spring having a loop intermediate its ends for registration with the chamber in one of the dogs as specified.

In testimony whereof, I have hereunto affixed my signature.

JOHN F. COLLINS.